Jan. 29, 1974     F. R. BUSCH     3,788,813
GAS CONDITIONING AND ANALYZING SYSTEM
Filed Sept. 7, 1971     3 Sheets-Sheet 1

INVENTOR:
FRANCIS R. BUSCH
BY: *Sam Laub*
ATTORNEY

United States Patent Office 3,788,813
Patented Jan. 29, 1974

3,788,813
GAS CONDITIONING AND ANALYZING SYSTEM
Francis R. Busch, Morgan Hill, Calif., assignor to
General Electric Company
Filed Sept. 7, 1971, Ser. No. 178,113
Int. Cl. G01n 31/12; G21c 17/00
U.S. Cl. 23—232 E
27 Claims

ABSTRACT OF THE DISCLOSURE

A gas conditioning and analyzing system for conditioning and analyzing a sample of gas of any given temperature, pressure and moisture content. The system draws off a sample of gas from a source in a conduit leading to a detection chamber having conditioning means and a sensing means which is connected to a gas analyzer. A gas and liquid outlet from the detection chamber has means for separating the gas from the liquid with the gas being passed in a flame isolation line and introduced into a flame checking chamber under liquid after which the gas is passed out of the system. The system is able to analyze potentially explosive mixtures of gases in a safe manner. The analysis is continuous and rapid.

BACKGROUND OF THE INVENTION

Nuclear chain fission reactions and the reactors in which they take place are now commonly used for the production of electrical power. A typical reactor includes a chain reacting assembly or core made up of nuclear fuel material contained in the fuel elements. The fuel material is generally encased in a corrosion-resistant, heat-conductive container or cladding. The reactor core, made up of a plurality of these fuel elements or rods in spaced relationship plus control rods or blades, in core-instrumentation, etc., is enclosed in a container or core shroud through which the reactor coolant flows. As the coolant passes between the spaced fuel rods, it is heated by thermal energy released in the fuel during the fission reaction. The heated coolant then leaves the reactor and the heat energy is used to perform useful work such as by driving a turbine-generator set to produce electrical power. The cooled coolant from the turbine-generator is purified by removing any particulate material and/or non-condensible gases from the coolant and the coolant is recycled back to the reactor.

In boiling water type reactors, the coolant is water with a portion of the water being evaporated in the core. The resulting steam is separated from the water within the reactor vessel and is directed to a load, such as a turbine. After passing through the turbine, the steam is condensed and the condensate is demineralized and treated to remove any particulate material such as corrosion products after which the condensate is returned to the reactor.

Under present commercial practice, the non-condensible gases which are mixed in the stream leaving the turbine are removed in the condenser, held for a suitable period to permit any short-lived fission and activation product gases which may be present in the stream to decay to safe levels, and then the gases (called off-gases) are vented to the atmosphere through a stack. These reactor off-gases primarily consist of air, which has leaked into the system through various flanges and fittings present in the nuclear reactor, and hydrogen and oxygen produced by radiolytic decomposition of water in the reactor core.

In the production of high pressure steam in a boiling water reactor power plant, a small percentage (about 0.007 percent) of the water traversing the radiation field in the reactor is decomposed by radiolysis generating stoichiometric quantities of hydrogen and oxygen. This gas content passes through the power generating turbine along with the steam. In addition small amounts of radioactive noble gases, such as xenon and krypton, are present in the off-gases. In a typical large reactor system, the total off-gas discharge is about 200 cubic feet per minute (of which about 90 percent is a radiolytically formed stoichiometric mixture of oxygen and hydrogen, and abount 10 percent is water vapor, air in-leakage and other gases). Included in the other gases are a few cubic centimeters per minute of fission product gases such as xenon and krypton. Although the amounts (about $10^{-6}$ percent or less by volume) of radioactive isotopes of xenon and krpton are minute, they account for almost all of the radioactivity (about 300 curies per cubic foot) of the off-gases. The presence of these radioactive contaminants necessitates the retention of the off-gases for about 30 minutes to permit the decay of these fission products before release to the environment.

It is generally necessary to retain the off-gases for about 30 minutes to prevent the xenon and krypton isotopes and the short-lived activation products to decay to safe levels before venting the gases to the atmosphere. This necessary delay requires that large volume of gases containing potentially explosive mixtures of hydrogen and oxygen must be stored for this period of time before venting. Standard practice has been to provide a large volume piping system designed to withstand explosions to hold this gas volume for the required period. For example, such a hold-up pipe may be a few feet in diameter and extend for several hundred feet. This hold-up system is expensive because of its size and the necessity of an explosion-proof design. Thus it would be highly desirable to eliminate the hazards and expense resulting from the need to retain large quantities of explosive gases for appreciable periods of time.

It has been proposed that this volume of off-gas be reduced by recombining the stoichiometric hydrogen-oxygen content of the off-gas to form water which would be condensable. This would both greatly reduce the qauntity of gas being stored and remove the danger of an explosion. Attempts have been made to use catalytic recombiners in this manner with one very successful recombiner in the form of an off-gas burner system being disclosed in U.S. Pat. No. 3,598,699 issued Aug. 10, 1971, entitled Nuclear Reactor Off-gas Burner System which patent is assigned to the same assignee as the present invention.

The foregoing recombiner and other recombiners require monitoring of the gas composition preferably both upstream and downstream of the recombiner for a rapid indication of the relative proportions of gases entering and leaving the recombiner. Gas chromatography is currently used for analysis of hydrogen in such systems, however, gas chromatography has an inherent disadvantage of requiring a long time for getting an accurate analysis of the gas composition. This long delay in obtaining gas analysis results in a long delay in detecting a recombiner system failure and a longer delay in taking corrective action such as switching to a standby recombiner. Further, this long delay in obtaining gas analysis results in the requirement of appreciable storage space for the gas before it is fed to the recombiner system due to the possibility of recombiner failure. Accordingly, it remains desirable to reduce the time required for furnishing an accurate, rapid gas analysis of the gas stream flowing into and out of the recombiner associated with a nuclear reactor and the nuclear reactor steam supply system to enable monitoring of the current status of the recombiner.

OBJECTS OF THE INVENTION

Accordingly it is an object of this invention to provide monitoring of the gas composition at a point upstream and a point downstream of the recombiner in a nuclear reactor and steam supply system. This monitoring of the gas composition before and after the recombiner system provides a check on the operation and efficiency of the recombiner.

It is another object of this invention to provide a rapid determination of gas composition flowing to the recombiner used in a nuclear reactor and steam supply system.

Still another object of this invention is to provide a monitoring system for the gas stream leaving the turbine which receives the steam supply from a nuclear reactor.

A still further object of this invention is to provide a monitoring system for the gas composition at a point upstream and a point downstream of a recombiner which system is able to analyze potentially explosive mixtures of gases in a safe manner.

SUMMARY

The foregoing objects and others, are accomplished by the gas conditioning and analyzing system of this invention which conditions a sample of gas of any given temperature, pressure and moisture content in preparation for analyzing the sample and then analyzes the sample with a gas analyzer. The sample of gas is conditioned very rapidly to desired parameters before analyzing the relative amount of the gaseous constituent(s) present, with a preferred analysis being for a gaseous constituent of hydrogen.

The analysis can be continuous and vacuum means is used to draw the sample into a detection chamber containing a sensing means in the form of a detector head for analyzing the gas which is connected to an indicating instrument for giving a reading of the analysis. The detection chamber also has means in the form of a body of liquid of controlled temperature achieving the conditioning of the gas sample. Since the gaseous constituents in some samples can form potentially explosive mixtures, a liquid is maintained in contact with the sample at critical points during the residence of the sample in the gas conditioning and analyzing system to isolate and negate the development of explosive conditions.

This is an especially safe and reliable system since flame arresters are utilized to ensure the isolation of explosive conditions.

BRIEF DESCRIPTION OF THE DRAWINGS

Various details of the invention and a preferred embodiment thereof may be further understood upon reference to the drawings, wherein.

DETAILED DESCRIPTION OF THE DRAWINGS

Figure 1:
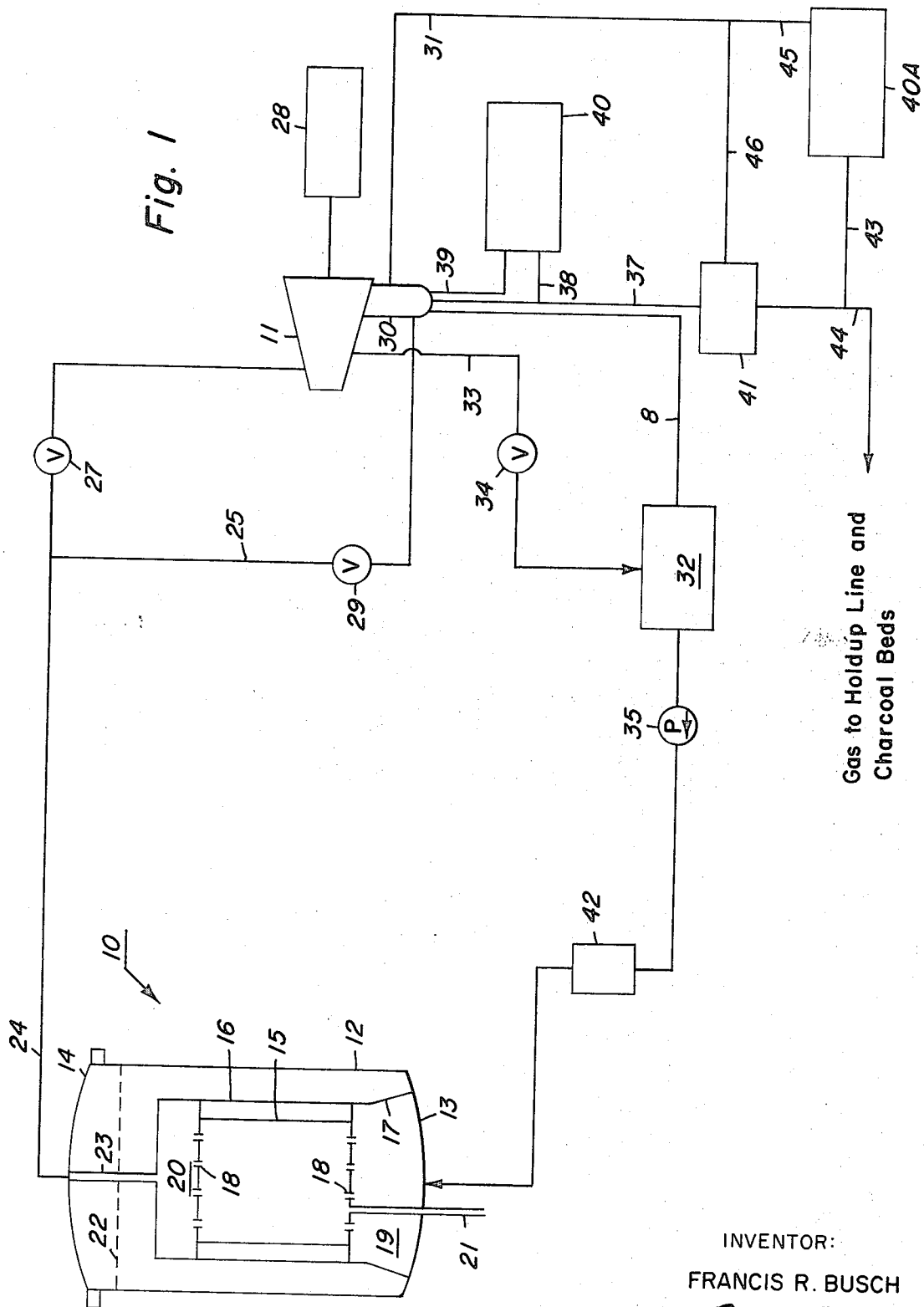
FIG. 1 shows a simple schematic flow sheet for a nuclear power plant incorporating the system disclosed in this invention.

Referring now to FIG. 1, there is shown a simple schematic diagram of a nuclear power plant, including a nuclear reactor generally designated as 10 which supplies steam to a turbine 11. Reactor 10 as shown here includes a generally cylindrical pressure vessel 12 closed at the bottom by a dish-shaped head 13 and at the top by a removable dome-shaped head 14. A core 15 is located in pressure vessel 12 mounted within a shroud 16 supported by a flaring skirt portion 17. Openings 18 are provided through core 15 to permit passage of coolant therethrough. Coolant enters core 15 from lower inlet plenum 19 and leaves the core 15 going into the upper outlet plenum 20 in the form of steam. Reactivity of core 15, and thus the output of steam, is controlled by control rods entering the core through the bottom of the reactor. Only one control rod 21 is shown for clarity. The annular space between shroud 16 and cylindrical wall 12 of the pressure vessel is filled with water to a level indicated by dashed line 22.

During the steady state operation of the reactor, superheated steam leaves outlet plenum 20 through riser 23 and steam line 24 entering turbine 11 after passing through valve 27. The steam drives turbine 11, which in turn drives generator 28 to provide electricity. Steam condensed in turbine 11 leaves in line 33 passing through valve 34 and entering feedwater heaters 32. Bypass line valve 29 in bypass line 25 is closed during steady state operation. The steam is condensed in main condenser 30 and the condensate is routed back to the reactor 10 in line 8 passing through feedwater heater 32, pump 35 and filter 42 to the reactor inlet plenum while the uncondensed gases pass in line 37 to a recombiner 41 which recombines hydrogen and oxygen into water vapor which is returned to the main condenser 30 in lines 46 and 31 and in turn is condensed in condenser 30. In FIG. 1, one hydrogen conditioning and analyzing system 40 is connected to line 37, which carries gases from the condenser 30 to the recombiner 41, by sample withdrawal line 38 and sample return line 39 is provided for returning the sample to condenser 30. A second hydrogen conditioning and analyzing system 40A is connected to line 44 by sample withdrawal line 43 for taking a sample leaving recombiner 41 with sample return line 45 being connected to line 31 for returning the sample to condenser 30. The operation of systems 40 and 40A which serve as monitors of the gaseous composition entering and leaving recombiner 41 will be described below.

Figure 2:
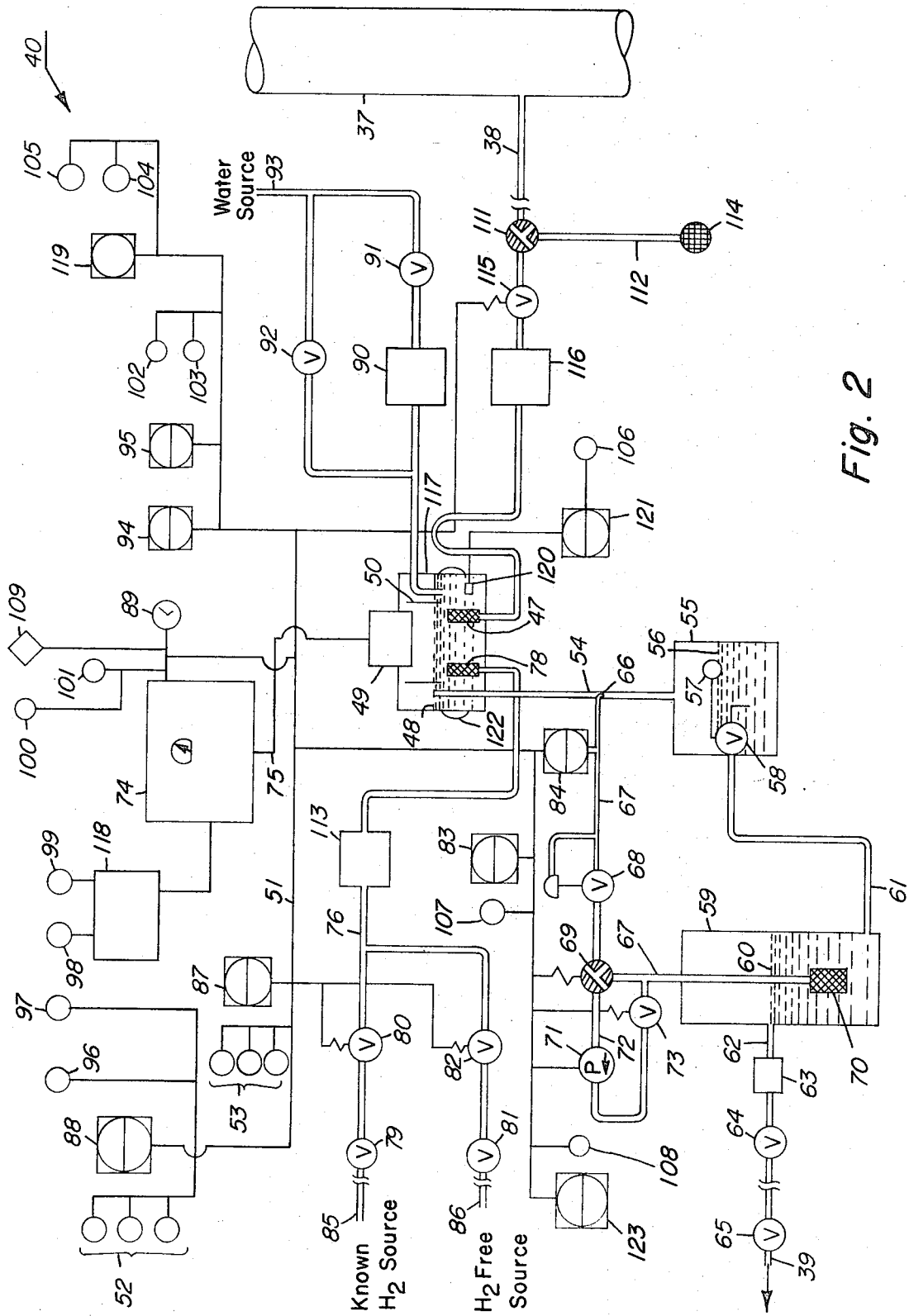
FIG. 2 shows a preferred embodiment of a gas conditioning and analyzing system according to the practice of this invention.

Referring now to FIG. 2 there is shown in greater detail the gas conditioning and analyzing system 40 of this invention (with 40A being an identical system). Samples of gases are withdrawn from the main process stream in line 37 and pumped in line 38 (a portion of the conduit means connecting a sampling point to the system) into the system by the main condenser vacuum (vacuum means) or by an auxiliary vacuum pump (vacuum means) in the absence of sufficient main condenser vacuum.

The process gas samples pass through three-way inlet valve 111 and solenoid shut off valve 115. Valve 111 can be set to receive either the process gas from line 37 or room air from line 112 drawn through filter 114. Valve 115 can be used to stop any gas from being drawn into line 38. The rate of flow of sample gas in line 38 is controlled by a flow indicating controller 116 to a pre-selected flow rate and is passed into sample detection chamber 117 through a sintered porous metal flame arrester (flame arrester means) 47 which is submerged under a body of liquid 48. The arrester 47 disperses the incoming gas into very small bubbles so that it bubbles up through the liquid giving up or absorbing temperature and moisture which is determined by the temperature of the liquid 48 in the detection chamber 217. The bubbling action further serves to condition the sample in that any particulate matter carried in the sample is picked up by the liquid. A preferred liquid 48 is water when the system 40 is set up to analyze the sample for its hydrogen content.

Liquid 48 is added to detection chamber 117 in line 93 through valve 91 and flow indicating controller 90 which flows in a controlled manner a predetermined amount of liquid to detection chamber 117. This maintains sufficient liquid in detection chamber 117 at desired temperatures to alter the incoming gas sample to the desired temperature and the desired moisture content. In this manner the detection chamber 117 controls the temperature of the gas sample. A means 122 of refrigeration or heating or both can be provided for the detection chamber 117 to further regulate the temperature of the liquid in chamber 117. Shut off valve 92 is used for rapid pre-filling of chamber 117, regulator chamber (liquid level regulator chamber) 55 and flame checking chamber 59 with liquid prior to operation of the system.

A sensing means in the form of a detection head 49 is mounted generally above arrester 47 with shroud 50 being positioned to guide the flow of sample gas to detection head (detecting unit) 49 and to reduce the relative volume of sample gas needed for rapid detection, especially for rapid detection of concentration changes in the incoming sample gas. The sample gas is analyzed for hydrogen content in the detection chamber 117 by the detection head 49 which is electronically connected by line 75 to an indicating instrument 74. Instrument 74 will electronically give a continuous indication and output reading proportional to the hydrogen content in volume percentage in comparison with the total gas volume of the sample gas within the detection chamber 117 at any given instant. A representative detection unit for the detector head 49 is either a standard hot wire unit such as the MSA thermatron unit made by the Mine Safety Appliance Company, a catalytic type unit such as the I–500 series analyzer made by the Mine Safety Appliance Company, or any other suitable detection unit. The hot wire unit measures heat transfer of the gas medium in contact with the wire relative to the atmosphere and gives the cooling effect due to the particular concentration of the gas constituent. By way of specific example, the greater the hydrogen content in the gas being analyzed the greater is the cooling effect. The catalytic unit measures the temperature created by burning the content of the gas constituent being analyzed. By way of specific example, the greater the hydrogen content in the gas being analyzed, the greater is the temperature due to the burning of hydrogen.

Electrical line 51 is used to connect switches 83, 87, 88, 94, 95, 119 and 123, recorder 118, indicator lights 52, 53 and 96–105, 107 and 108 (which are provided at positions visible by plant personnel at various places in the plant to alert them of possible problems with the hydrogen input and can be arranged for some of the lights to come on at different hydrogen concentrations) and a program timer 89 which controls the operating sequence of this system to permit intake of the gases from either lines 37, 112, 85 or 86. Light bulb 106 is connected to temperature switch 121 and liquid filled temperature bulb 120 which senses the temperature of liquid 48. Light bulb 106 is actuated when a certain temperature is reached.

Gas inlet line 85 is connected to a source (not shown) of gas containing a predetermined known percentage of hydrogen for hydrogen calibration purposes. Gas inlet line 86 is connected to a source (not shown) of a hydrogen free gas for zero reference calibration purposes. Line 85 is provided with valves 79 and 80 and line 86 is provided with valves 81 and 82 to control the flow of gas through the lines which merge into line 76 which has flow regulating controller 113. Flame arrester (flame arrester means) 78 is provided submerged under liquid 48 such as water in detection chamber 117 for release of the gas from lines 85 and 86. The flow of gas in lines 85 and 86 is controlled manually by the control switches 87 and 88 or automatically by a program timer 89 which energizes either of the solenoid operated valves 80 or 82 (as well as switching off valve 115 in line 38). Program timer 89 provides for hydrogen content and zero calibration checks at periodic intervals during which these calibration gases are sample conditioned in detection chamber 117 to the approximately exact temperature and moisture content along with regulation of the pressure as is practiced for the sample gas from line 37.

The vacuum drawn on the detection chamber 117 for drawing the sample through the system is controlled by regulator valve 68 described more fully hereinafter which is set at any pre-selected condition, for example a vacuum in the range of about 27 to about 30 inches of water. This provides sufficient vacuum for drawing the sample gas into and through the system 40 when the sample gas is at atmospheric pressure or above at the junction of line 37 to line 38. This enables maintaining a steady flow of the sample gas into detection chamber 117.

A pressure indicating switch 84 is provided in this system 40 connected to the sample gas inlet solenoid valves 69, 73, 80, 82 and 115 and vacuum pump 71. This provides a "permissive" condition to open an inlet solenoid valve for a sample gas when a vacuum condition is drawn on the system. This will also isolate and shut off the sample gas due to vacuum failure, power failure, or loss of vacuum due to other reasons.

A stand pipe (overflow) 54 is provided in the detection chamber 117 to maintain a given water level and provide a line for release of the sample gas and liquid out of detection chamber 117. Overflow water in pipe (gas-liquid outlet) 54 from the detection chamber 117 is collected in the regulator chamber 55 which pipe 54 serves to control the water level in detection chamber 117. The water level 56 is maintained in the regulator chamber 55 by a float-operated valve 58. When float 57 is raised to a level sufficient to actuate valve (valve means) 58, water is discharged in pipe 61 into the bottom of the flame checking chamber 59. The flame checking chamber 59 contains a predetermined water level 60 with overflow water passing out of chamber 59 in line 62 through flow glass 63 and valves 64 and 65 to the main condenser 30 (not shown in FIG. 2). The foregoing system provides a water cover and cooling effect on the gas in the system preventing explosion along the water discharge path from the detection chamber 117 to the main condenser 30 for positive flame and detonation isolation. Due to the fact that lines 67 and 54 are connected to liquid bodies 48 and 60, flame arrest and isolation are also achieved in these lines. The flow glass 63 is provided on the line (a portion of the condiut means connecting a discharge point to the system) 62 leading to the main condenser for visual assurance of sufficient water pre-fill and for visual assurance of a continuous water supply being provided to and withdrawn from the system 40. An elevation differential of at least about 30 inches of water is maintained between the valve 58 at the connection to line 61 for the water level regulator chamber 55 and water level 60 in the flame checking chamber 59.

Having completed the discussion of the fluid flow in system 40, the gas flow from chamber 117 through the rest of the system 40 will be discussed. The sample gases are withdrawn from chamber 117 in line 54 by the vacuum drawn on T connection 66 which enables a gas separation from the water with the gas passing in line 67 through a vacuum regulator valve 68 and solenoid operwith introduction of the gas in small bubbles in chamber 59 through a sintered metal flame arrester (flame arrester means) 70. This separation enables even flow of gas and liquid in system 40 and prevents pressure variation in system 40. When an auxiliary vacuum (vacuum means for drawing a vacuum) is necessary, such as when the main condenser vacuum (vacuum means for drawing a vacuum) is insufficient to provide adequate vacuum, the three-way solenoid valve 69 is energized so that auxiliary vacuum pump 71 in line 72 provides additional vacuum. This draws the gas into line 72 through the valve 73 into the flame checking chamber 59. The gas passes through the same sintered metal flame arrester (flame arrester means) 70 submerged beneath liquid 60.

Figure 3:
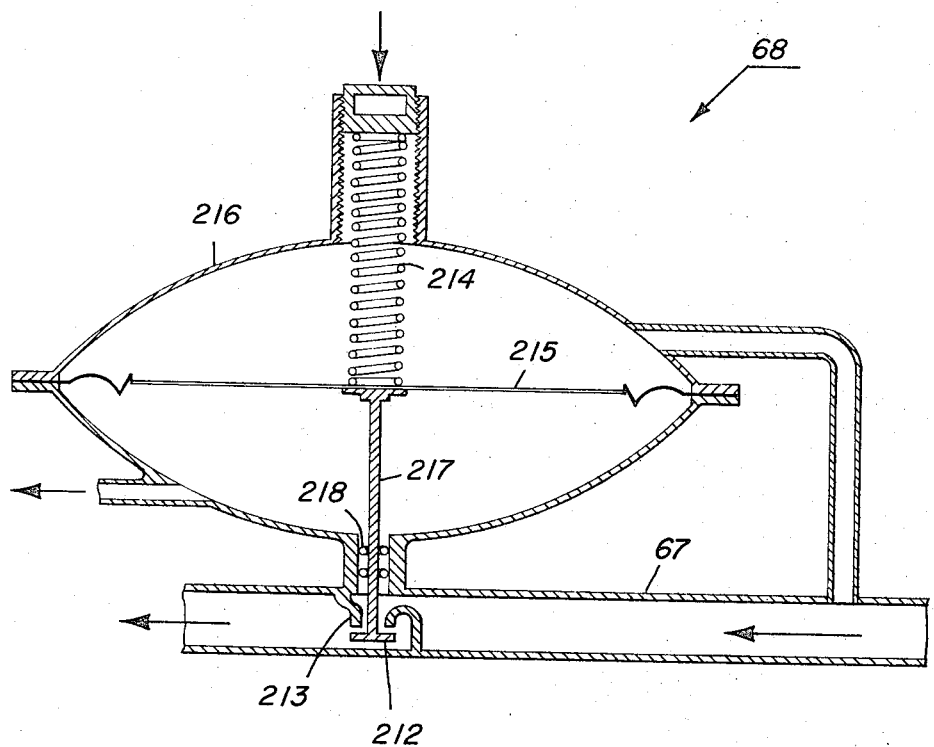
FIG. 3 shows a detailed drawing of the vacuum pressure regulator valve used in the preferred embodiment of the gas conditioning and analyzing system shown in FIG. 2.

In greater detail vacuum regulator valve 68 provides the constant pressure regulation for the sample gases in detection chamber 117. As shown in FIG. 3 vacuum regulator valve 68 is a diaphragm operated valve that uses the vacuum drawn on line 67 to close the valve stopper 212 against the valve seat 213 to close the valve 68. An equilibrium is reached when the vacuum drawn on line 67 equals the opposing force of spring 214 on the diaphragm 215 which will position the stopper 212 somewhere between the valve being fully open on the bottom of line 67 and fully closed on the valve seat 213. The vacuum drawn on line 67 is regulated at a constant value selected by adjusting the tension of the spring 214 on the diaphragm 215 in the housing 216.

The system for gas conditioning and analyzing described above has the following functions and advantages. The system 40 provides a constant pressure, temperature and humidity for any sample or calibration gas injected into the detection chamber 117 regardless of the original gas pressure, temperature and humidity of the sample drawn into chamber 117. This system 40 provides a short response time of generally less than about ten seconds to detect hydrogen concentration changes at the gas sample inlet 38 by the rapid sample conditioning of the sample gases injected into the water 48 from the sintered metal flame arrester (flame arrester means) 47 and bubbled up through the water 48 to the detection head (detecting unit) 49. Further a positive flame detonation arrest and isolation is provided by the liquid level regulator chamber 55 and flame checking chamber 59 for the water flow path from the point of withdrawing a gas sample to the discharge of the sample to the main condenser. There can be a constant water supply in the system 40 through the addition of water into the system which provides cooling or heating of the sample gases depending upon the temperature of the incoming gases. Further additional heating or refrigeration can also be provided by heating means or cooling means located either within or around the detection chamber 117 to obtain any desired temperature and humidity conditions for the sample gases.

While this system has been described for a preferred utility with a nuclear chain fission reactor and connected apparatus for hydrogen analysis with the fluid in the system being water, this system can be adapted to many other applications where it is difficult to obtain consistent, reliable and safe gas analysis of wet or dry volumes of gas.

As will be apparent to those skilled in the art, various modifications and changes may be made in the system and apparatus described herein. It is accordingly the intention that the invention be construed in the broadest manner within the spirit and scope as set forth in the accompanying claims.

What is claimed is:
1. A gas conditioning and analyzing system comprising, in combination,
    (a) conduit means connecting a sampling point and a discharge point to the system, the sampling point being connected by the conduit means to
    (b) a detection chamber having a liquid reservoir for receiving a gas sample from the conduit means, a detecting unit for gas analysis and a gas-liquid outlet directing the liquid to
    (c) a regulator chamber having valve means for regulating the liquid level therein, and the gas-liquid outlet directing the gas to
    (d) a flame checking chamber for release under liquid, the flame checking chamber being connected to the conduit means leading to the discharge point, and
    (e) a vacuum means for drawing the gas sample through the system.
2. A gas conditioning and analyzing system of claim 1 in which the liquid is water.
3. A gas conditioning and analyzing system of claim 1 in which the detecting unit is capable of detecting hydrogen.
4. A gas conditioning and analyzing system of claim 1 in which the gas sample is introduced to the detection chamber through a flame arrester means submerged under the liquid.
5. A gas conditioning and analyzing system of claim 1 in which the detecting unit in the detection chamber is a catalytic unit.
6. A gas conditioning and analyzing system of claim 1 in which the detecting unit in the detection chamber is a hot wire unit.
7. A gas conditioning and analyzing system of claim 1 in which a source of calibration gas of known hydrogen concentration and a source of hydrogen free calibration gas are capable of being selectively introduced into the detection chamber through a flame arrester means submerged under the liquid.
8. A gas conditioning and analyzing system of claim 1 in which the flame checking chamber has a flame arrester under liquid receiving the gas to be released in the flame checking chamber.
9. A gas conditioning and analyzing system of claim 1 which is connected to a line receiving the gaseous discharge from a main condenser in a nuclear steam supply system.
10. A gas conditioning and analyzing system of claim 1 which is connected to a line receiving the gaseous discharge from a recombiner unit in a nuclear steam supply system.
11. A gas conditioning and analyzing system comprising, in combination,
    (a) conduit means connected to a sampling point and a first flame arrester means, the flame arrester means being enclosed within
    (b) a detection chamber containing liquid and having a detecting unit for gas analysis and a gas-liquid outlet, the outlet directing the liquid to
    (c) a liquid level regulator chamber having valve means for regulating the liquid level therein and the outlet directing the gas through a vacuum regulator valve and into
    (d) a flame checking chamber for release under liquid through a second flame arrester means, the flame checking chamber receiving liquid from the regulator chamber,
    (e) a conduit means connected to the flame checking chamber leading to a point for discharge of the gas, and
    (f) a vacuum means for drawing the sample gas through the system.
12. A gas conditioning and analyzing system of claim 11 in which the liquid is water.
13. A gas conditioning and analyzing system of claim 11 in which the detecting unit is capable of detecting hydrogen.
14. A gas conditioning and analyzing system of claim 11 in which the detecting unit in detection chamber is a catalytic unit.
15. A gas conditioning and analyzing system of claim 11 in which the detecting unit in the detection chamber is a hot wire unit.
16. A gas conditioning and analyzing system of claim 11 in which a source of calibration gas of known hydrogen concentration and a source of hydrogen free calibration gas are capable of being selectively introduced into the detection chamber through a third flame arrester means submerged under liquid.
17. A gas conditioning and analyzing system of claim 11 which is connected to a line receiving the gaseous discharge from a main condenser in a nuclear steam supply system.
18. A gas analyzer and conditioning system of claim 11 which is connected to a line receiving the gaseous discharge from a recombiner unit.
19. A gas analyzer and conditioning system of claim 11 which has temperature control means regulating the temperature of the detection chamber.
20. The method for conditioning and analyzing a gas sample comprising the steps of
    (a) introducing the gas sample to a detection chamber for release under a liquid of desired conditions,
    (b) analyzing the sample gas introduced to the detection chamber for the concentration of the selected constituent,
    (c) separating the gas from the liquid,

(d) introducing the gas into a flame chacking chamber for release under a liquid, and
(e) discharging the liquid and gas from the system to a disposal point.

21. The method of claim 20 in which the liquid is water.

22. The method of claim 20 in which the gas analysis is for hydrogen.

23. The method of claim 20 in which the analyzing step is conducted by using a catalytic analysis.

24. The method of claim 20 in which the analyzing step is conducted by using a hot wire analysis.

25. The method of claim 20 wherein a prior calibration step is conducted using a source of hydrogen calibration gas of known hydrogen concentration and a source of hydrogen free calibration gas.

26. The method of claim 20 in which the gas sample is drawn from the gaseous discharge of a main condenser in a nuclear steam supply system.

27. The method of claim 20 in which the gas sample is drawn from the gaseous discharge of a recombiner unit in a nuclear steam supply system.

References Cited
UNITED STATES PATENTS 2,329,459  9/1943  Dickey _____ 23—232 E
3,340,013  9/1967  Rooney et al. ___ 23—255 E X MORRIS O. WOLK, Primary Examiner R. M. REESE, Assistant Examiner U.S. Cl. X.R.

23—254 E; 176—19 LD, 37

UNITED STATES PATENT OFFICE
CERTIFICATE OF CORRECTION

Patent No. 3,788,813          Dated 29 January 1974

Inventor(s) F. R. Busch

It is certified that error appears in the above-identified patent and that said Letters Patent are hereby corrected as shown below:

Column 1, line 35, "in core-" should be --in-core--. Column 2, line 8, "abount" should be --about--; and line 13, "krpton" should be --krypton--. Column 4, line 55, "217" should be --117--. Column 6, line 34, "condiut" should be --conduit--; and line 49, after "solenoid" insert --operated valve 69 and then to the flame checking chamber 59-- and delete "oper-". Claim 20, line 9, "chacking" should be --checking--.

Signed and sealed this 1st day of October 1974.

(SEAL)
Attest:

McCOY M. GIBSON JR.
Attesting Officer

C. MARSHALL DANN
Commissioner of Patents